US008966039B1

(12) United States Patent
Fultz et al.

(10) Patent No.: US 8,966,039 B1
(45) Date of Patent: Feb. 24, 2015

(54) END-TO-END COMMUNICATION SERVICE MONITORING AND REPORTING

(75) Inventors: David K. Fultz, Raymore, MO (US); Victor A. Vijayakirthi, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 465 days.

(21) Appl. No.: 13/093,800

(22) Filed: Apr. 25, 2011

(51) Int. Cl.
*G06F 15/173* (2006.01)

(52) U.S. Cl.
USPC ............ 709/223; 709/224; 709/225; 709/226

(58) Field of Classification Search
USPC .......................... 709/223, 224, 225, 226, 227
See application file for complete search history.

(56) References Cited

U.S. PATENT DOCUMENTS

| | | | | |
|---|---|---|---|---|
| 6,738,811 | B1 * | 5/2004 | Liang | 709/224 |
| 7,617,313 | B1 * | 11/2009 | Washburn et al. | 709/224 |
| 7,822,837 | B1 * | 10/2010 | Urban et al. | 709/223 |
| 7,844,443 | B2 * | 11/2010 | Betarbet et al. | 703/22 |
| 8,239,527 | B2 * | 8/2012 | Maiocco et al. | 709/224 |
| 2006/0064485 | A1 * | 3/2006 | Baron et al. | 709/224 |
| 2007/0094381 | A1 * | 4/2007 | Weiss et al. | 709/224 |
| 2008/0189308 | A1 * | 8/2008 | Sangal et al. | 707/100 |
| 2009/0073894 | A1 * | 3/2009 | Nimon et al. | 370/254 |
| 2011/0028135 | A1 * | 2/2011 | Srinivasan | 455/415 |

* cited by examiner

*Primary Examiner* — Dhairya A Patel

(57) ABSTRACT

A system for end-to-end communication service monitoring is provided. The system comprises a processor, a memory, and a monitoring application stored in the memory. The memory also stores a resource dependency matrix, wherein the resource dependency matrix describes dependencies between a plurality of network and functional resources. When executed by the processor, the application registers a first client device for periodic notifications of a status of a network resource, monitors a metric associated with a first component of the network resource and monitors a metric associated with a second component of the network resource, determines a status of the network resource based on the metric associated with the first component, based on the metric associated with the second component, and based on the resource dependency matrix, and publishes a notification of the first status.

19 Claims, 4 Drawing Sheets

US 8,966,039 B1

END-TO-END COMMUNICATION SERVICE MONITORING AND REPORTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service agreements for users of enterprise applications may be negotiated as part of a service contract where the level of service is formally defined. The agreement may refer to the contracted delivery time of the service and the contracted quality of service. The agreement may be negotiated between two parties where one is the customer and the other is the service provider. The agreement may document a common understanding about services, priorities, responsibilities, guarantees, and warranties under which service is to be provided. Each area of service scope may have a level of service defined. The agreement may specify the levels of availability, serviceability, performance, operation, or other attributes of the service, such as billing. An organization such as a telecommunications service provider may do business under a service agreement with external customers or with internal departments or units. The terms of the service agreement may vary depending on the nature of the relationship.

SUMMARY

In an embodiment, a system for end-to-end communication service monitoring is disclosed. The system comprises a processor, a memory, and a monitoring application stored in the memory. The memory also stores a resource dependency matrix, wherein the resource dependency matrix describes dependencies between a plurality of network and functional resources. When executed by the processor, the application registers a first client device for periodic notifications of a status of a network resource, monitors a metric associated with a first component of the network resource and monitors a metric associated with a second component of the network resource, determines a status of the network resource based on the metric associated with the first component, based on the metric associated with the second component, and based on the resource dependency matrix, and publishes a notification of the first status.

In an embodiment, a processor-implemented method for end-to-end monitoring of a communication service is provided. The method comprises a computer assessing a status of a network resource based on analyzing a resource dependency matrix, based on periodic monitoring of a first performance metric of a first component of the network resource, and based on periodic monitoring of a second performance metric of a second component of the network resource. The resource dependency matrix describes dependencies between a plurality of network and functional resources. The method also comprises the computer publishing a first status on a first periodic basis in a notification to a first client device. The method also comprises the computer determining that a first performance degradation associated with a first instance of the first performance metric exceeds a first predetermined threshold. The method also comprises the computer publishing a second status on a second periodic basis based on the first performance degradation wherein the second periodic basis is more frequent than the first periodic basis.

In an embodiment, a processor-implemented method for end-to-end monitoring of a communication service is provided. The method comprises a computer assessing a status of a network resource based on analyzing a resource dependency matrix and based on periodic monitoring of end-to-end components of the network resource. The resource dependency matrix describes dependencies between a plurality of network and functional resources. The monitoring of the end-to-end components comprises storing and analyzing a first performance metric associated with a first component and a second performance metric associated with a second component of the network resource. The method also comprises the computer storing a first plurality of instances of the first performance metric and the second performance metric. The method also comprises the computer performing a first analysis of the first plurality of the stored instances of the first performance metric and second performance metric. The method also comprises the computer identifying, based on the first analysis, an occurrence of a first performance degradation of the first component associated with a second plurality of the stored instances wherein the second plurality is a subset of the first plurality. The method also comprises the computer determining, based on a second analysis of a third plurality of the stored instances of the first performance metric, that the first performance degradation is an anomalous event that is not indicative of a component failure, wherein the third plurality is a subset of the first plurality, and wherein the third plurality of stored instances is associated with a third plurality of timestamps and the second plurality is associated with a second plurality of timestamps, and wherein the timestamps indicate that the third plurality stored instances occurred subsequent to the second plurality of stored instances. The method also comprises the computer canceling a scheduled notification associated with the first performance degradation, the cancellation based on the determination that the first performance degradation was an anomalous event and not indicative of a component failure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
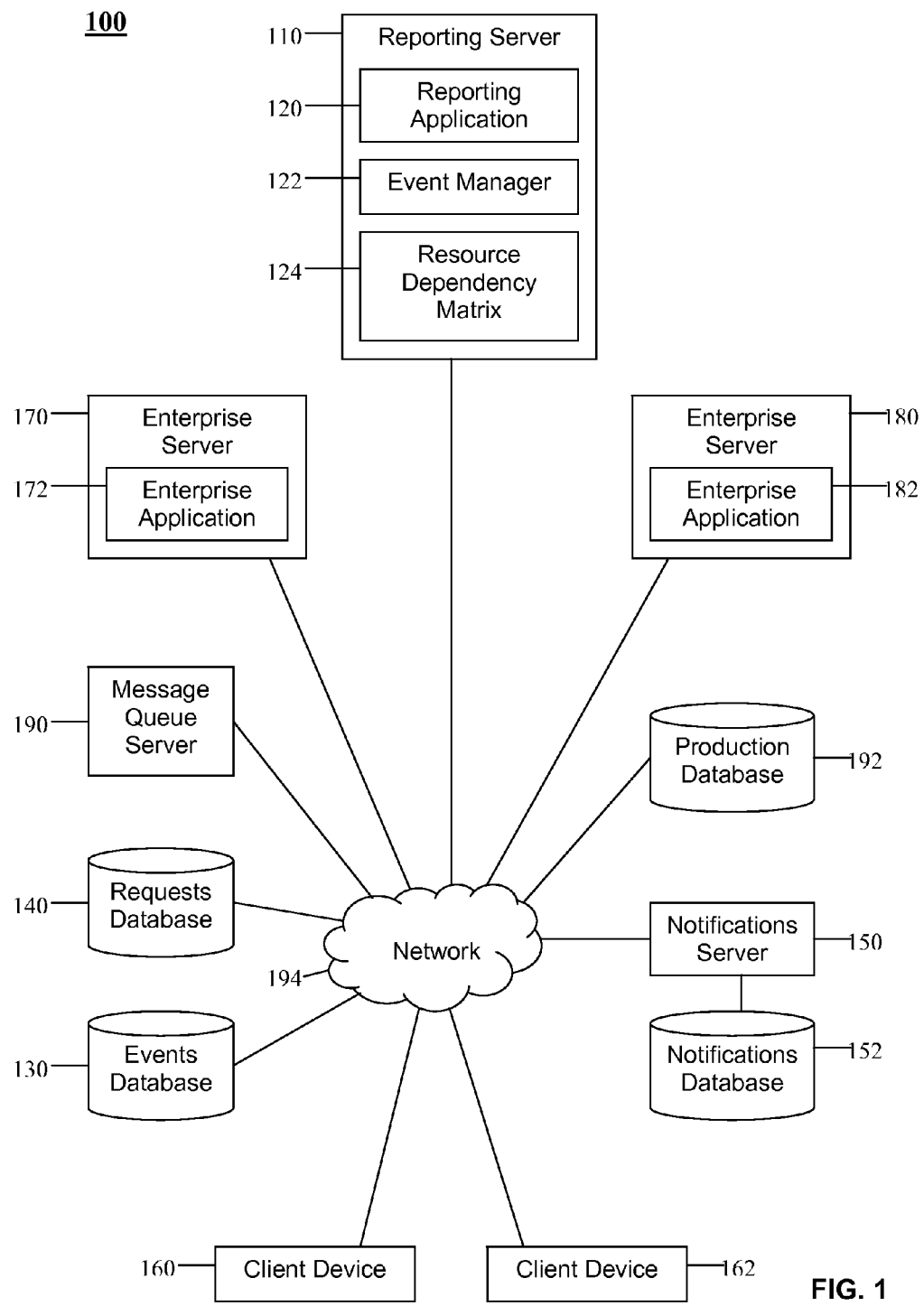
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote an organization with enterprise applications and servers to monitor the status of a communication service on an end-to-end basis including monitoring hardware and software components supporting the communication service. In an embodiment, a publish/subscribe messaging arrangement is used to selectively provide notifications to client devices about the status of the enterprise applications in which client devices are interested. The client devices may be interested in specific interfaces or services of an enterprise application. They may subscribe to be regularly notified of the availability of a particular user interface or service, and by connection, the condition and status of the enterprise application accessed using the interface. The client devices may wish to receive a regular "heartbeat" signal indicating that the enterprise application is online and functioning normally. A client device may send a subscription message to the system to cause the system to publish and/or to send event and/or status messages to the client device. The subscription message may identify what types of events the system publishes to the client device. The subscription message may identify how or through what communication mechanism events are to be transmitted to the client device. The subscription message may identify when or how often event messages and/or status messages are to be transmitted to the client device. The system may provide alerts or specialized notifications for particularly noteworthy events such as overloads, degradations, or failures that may affect the availability of the interface or service of interest to the client device.

The system non-intrusively monitors a plurality of components of the enterprise application of interest by receiving event messages from the components. Software agents associated with the monitored components may transmit event messages to an event manager. A reporting application and the event manager may execute on one or more computers separate from the computers hosting the enterprise application and place minimal processing burden on the enterprise application hosting computers. The publish/subscribe mechanism enables the system to maintain an abstraction layer between the client devices interested in the enterprise application and the hosting computers. The abstraction layer effectively promotes the client device to focus on the availability of the interface and services provided by the enterprise application instead of the individual computers or components supporting the application.

The system promotes the protecting of the hosting computers and supporting computers from client devices that may submit queries to merely test the status or health of the enterprise application. A telecommunications service provider, for example, selling wireless services through retailers of mobile telephones may discover that the retailers partially submit fictitious transactions to the provider's online interface to test the status of the interface and underlying application. This imposes costs and processing burden on the provider. The system and methods provided herein promote the discontinuance of this practice by publishing periodic notifications for access by client devices of the retailer advising of the status of the interface and associated application. Notifications, if requested by client devices, may also advise on the status of supporting servers and other supporting components such as network devices, databases, and message queue servers.

In an embodiment, the system creates a resource dependency matrix based on a data store containing each monitored resource and its dependency resources. Resources may be applications, services, or hardware components. The resource dependency matrix describes dependencies between a plurality of network resources and functional resources. The matrix is bi-directional and hierarchical and for a given resource depicts other resources it depends on as well as resources depending on it. This promotes predictions of the impact of a component failure on a plurality of components linked via dependency to the failing component. Understanding dependencies allows a telecommunications service provider to predict component failures and take action before failures occur, such as rerouting network traffic or reallocating processing load to other components.

Turning now to FIG. 1, a system 100 is provided. The system 100 comprises a reporting server 110, a reporting application 120, an event manager 122, an events database 130, a requests database 140, a notifications server 150, and a notifications database 152. The system 100 also comprises client devices 160, 162, enterprise servers 170, 180, enterprise applications 172, 182, a message queue server 190, a production database 192, and a network 194.

The reporting server 110 is a computer system. Computer systems are described in detail herein after. The reporting application 120 executes on the reporting server 110. The reporting application 120 receives messages from a plurality of client devices 160, 162 containing requests for notifications about the status of enterprise resources, for example the enterprise applications 172, 182. The reporting application 120 registers the client devices 160, 162 to receive published notifications about a plurality of events of interest. The events may relate to the enterprise applications 172, 182, their interfaces, and their supporting hardware components. The reporting application 120 monitors these enterprise resources for status on a non-intrusive basis and regularly publishes the notifications to an accessible location for the client devices 160, 162. The client devices 160, 162, that may be associated with entities outside the enterprise, receive the notifications they have subscribed to from the notifications server 150 on a push or pull basis. The client devices 160, 162 may, for example, be computers associated with distributors or customers of the enterprise operating the reporting application 120 and may access the enterprise applications 172, 182 to enter orders and request services.

Customers and distributors of the enterprise may be the users of the client devices 160, 162 and are concerned about the continuing availability and health of the enterprise application 172 that may be critical to their business. The enterprise may, for example, be a telecommunications service provider selling wireless services under subscription plans, and the client devices 160, 162 may be associated with an electronics retailer. The retailer may access the enterprise application 172 many thousands of times per day to provision mobile telephones and arrange wireless communication service subscriptions for retail customers purchasing the mobile telephones. The system 100 and methods provided herein monitor the end-to-end hardware and software components of a communications service. The components may be located directly within the enterprise server 170, such as a processor or memory. The components may be in supporting functions of the enterprise server 170 and the enterprise application 172, such as networking devices or the message queue server 190. This approach provides a truer and more complete picture of the status of the enterprise application 172. The system 100 does not merely capture metrics associated with events generated by hardware components of the enterprise servers 170, 180 hosting the enterprise application 172, 182, for example server processor capacity. The system 100 additionally monitors software metrics associated with the enterprise application 172, the related message queue server 190, the production database 192, and network devices handling traffic associated with the enterprise application 172. The system monitors the end-to-end hardware and software components supporting the enterprise application 172 providing the service or interface of interest to the client devices 160, 162. The components used by the enterprise application 172 to be fully functional and perform to agreed and expected levels are monitored. These components may be reported on directly in the notifications, depending on the nature of requests made by the client devices 160, 162. The services or interfaces that depend on the components may alternatively be the subjects of the notifications with the status of the underlying components effectively abstracted out of the notifications.

While previous implementations of component monitoring may be directed to hardware aspects of a server configuration hosting the enterprise application 172, the present disclosure teaches the additional monitoring of supporting services or activities such as message queue activity and depth and database read and write activity. These supporting components may be as important to the performance of the enterprise application 172 as the core hardware components of the enterprise server 170 on which the enterprise application 172 is executing. Whereas, for example, metrics of the enterprise server 170 such as processor and memory utilization may appear normal, the status of other supporting devices and software such as the message queue server 190 and the production database 192 may be equally important to the performance and continued availability of the enterprise application 172. The reporting application 120 receives events associated with the status of many or all components affecting the availability of the enterprise application 172, whether hardware or software and whether directly accessed by the enterprise application 172 or not.

The reporting application 120 additionally learns of and accounts for dependencies between components supporting the enterprise application 172 wherein a degradation or failure of one component may cause or otherwise result in other components to experience stress, degradation, or failure and may result in the enterprise application 172 failing. Dependencies between components are relational such that the ability of the enterprise application 172 to present a user interface may be related to the enterprise server 170 accessing data from the production database 192. If the production database 192 is not directly connected to the enterprise server 170, a network device may be required, creating another dependency. The enterprise application 172 depends on the enterprise server 170 that may depend on a network device to reach the production database 192. Software components along the way such as a query sent to the production database 192 by the enterprise server 170 on behalf of the enterprise application 172 may create additional dependencies. The reporting application 120 learns of these dependencies across components and maps and tracks the dependencies.

The reporting application 120 may determine backup or auxiliary components to activate in the event of overload, degradation, or failure. When enterprise applications 172, 182 are executing on two or more enterprise servers 170, 180, respectively, the reporting application 120 may receive events from each of the enterprise servers 170, 180, message queue server 190, the production database 192, network components, and other components on which the enterprise applications 172, 182 depend. The reporting application 120 constructs a matrix of dependencies for the enterprise applications 172, 182 depicting which enterprise servers 170, 180 depend on which components and depicting how the failure of a single component may affect other components and potentially cause more than one enterprise application 172, 182 to fail. This may promote the reporting application 120 to predict component degradations and failures and may promote the addressing of problems before they become critical and come to the attention of the client devices 160, 162 through the publishing of status notifications as taught herein. Problems may be detected and resolved without the knowledge of the client devices 160, 162.

The present disclosure teaches the monitoring of a plurality of components and the publishing of notifications of events of interest per the subscription arrangements provided the client devices 160, 162 at their request. The reporting application 120 monitors the components and publishes notifications about some events to the notifications database 152. While client devices 160, 162 may express an interest in the status of the enterprise servers 170, 180, their ultimate interest more likely may lie in the services provided by the enterprise applications 172, 182 and their interfaces on which the client devices 160, 162 rely for their business. The enterprise may provide the enterprise applications 172, 182 under service level agreements (SLA) to client organizations with which the client devices 160, 162 are associated. The reporting application 120 expands non-intrusive monitoring beyond hardware components of the enterprise servers 170, 180 to the broader set of enterprise components the enterprise applications 172, 182 rely on.

The reporting application 120 may abstract out the complexity of the components monitored and may simplify reporting in the notifications provided to the client devices 160, 162 under their subscription arrangements. This may be configurable by the client devices 160, 162. The interest of the client devices 160, 162 may be more in the availability of a particular service or interface and less with the components that underlie the service or interface. The client device 160 may not care whether it is a processor problem or a message queue problem that is the cause of an interface not being available or functioning at an unacceptably slow rate. The client device 160 may configure the amount of detail or "granularity" desired in the notifications it receives. The client device 160 may desire simplicity and economy and wish to know about the interface alone and not its underlying components. The reporting application 120 abstracts out these underlying components if configured by the client device 160 and presents notifications at the level desired by the client device 160.

In a use case illustrating the teachings of the present disclosure, the telecommunications service provider may, for example, make online enterprise applications 172, 182 available that retailers of electronic devices such as mobile telephones may remotely access. The retailers may access the enterprise applications 172, 182 to fulfill orders for wireless service subscriptions and device provisioning during sales at retail locations or while fulfilling online or telephone orders at service centers. Most of the software and hardware components of the enterprise application 172 in this example are not physically located at the premises of retail stores and are instead at the remote premises of the telecommunications service provider or elsewhere. Since the enterprise application 172 may be of importance to the retailer, the retailer may seek to frequently test the enterprise application 172 to assure that it is operational and ready to handle new orders, for example. Without a formal monitoring and notification apparatus such as that taught herein, the retailer may conduct its own testing by regularly accessing the enterprise application 172, even when the retailer is not doing so to fulfill an actual order. The retailer may follow this practice against the wishes of the telecommunications service provider. The retailer may access one or more screens or interfaces of the enterprise application 172 and may enter sample data and partially complete a transaction to test the responsiveness of the enterprise application 172 before canceling out of the transaction. The retailer may do this frequently during business hours. The retailer may effectively desire a regular and frequent "heartbeat" of the enterprise application 172 to have assurance that the enterprise application 172 is up and running and providing desired functionality. While this mechanism may inefficiently use the architecture of the telecommunications service provider, it may satisfy the need of the retailer for the heartbeat information.

While accessing the enterprise application 172 from the retail store and initiating then canceling a transaction may allow the retailer to gain assurance that the enterprise application 172 is running and that the supporting hardware and software are presumably functioning normally, this strategy may be costly and burdensome for the telecommunications service provider. The information systems of the telecommunications service provider may be unable to distinguish between transactions intended solely for testing and actual transactions that are initiated then canceled for valid reasons. Since this distinction may not be made, this activity by the retailer may also distort or skew the usage metrics for the enterprise application 172 and other components. This process may be antagonistic and debilitating for the telecommunications service provider, particularly if the retailer is a large organization with many sites and test transactions are submitted hundreds or thousands of times per day. In addition, each access by the retailer may consume bandwidth on a high speed transmission line into the infrastructure of the telecommunications service provider and may impose real costs to the telecommunications service provider. A rating and billing department of the telecommunications service provider may levy charges on the business unit of the telecommunications service provider for accesses, even if the accesses are only to test the enterprise application 172. Consequently, while the retailer's accessing of the enterprise application 172 and opening of test transactions may suit the retailer's needs for assurance that the enterprise application 172 is operational and available, this situation imposes unnecessary cost and burden on the telecommunications service provider The aforementioned behavior by the retailer is incompatible with the intended purpose and design of an application programming interface (API) associated with the service of interest to the client device. The present disclosure teaches the system 100 and methods that provide the client devices 160, 162 various means to receive regular notifications about the status of the enterprise application 172 without the infrastructure of the telecommunications service provider receiving the described stress and cost. The infrastructure of the telecommunications service provider is non-intrusively monitored for events generated by components of the enterprise application 172 and components that support the enterprise application 172. Messages about events occurring at the monitored components are sent to the events database 130 for subsequent analysis, extraction, and inclusion in notifications by the reporting application 120 to the client devices 160, 162. Once client devices 160, 162 have registered for notifications, the notifications server 150 may be the single point of contact of the telecommunications service provider for client devices 160, 162 to obtain notifications. This may relieve the telecommunications service provider from the previous bombardment of incoming transmissions from many different external requesters. In an embodiment, a single client device 160 for a requesting client could be the sole requester and recipient of notifications. Whereas previously, hundreds or thousands of different devices associated with the retailer may have been submitting a large quantity of test transactions through a plurality of points of ingress of the telecommunications service provider, the present disclosure may promote as few as two devices, the notifications server 150 and the client device 160, handling this communication on behalf of the telecommunications service provider and the retailer, respectively. Once the client device 160 receives the notifications, it may distribute the notifications internally to the parties that have requested them.

The client devices 160, 162 are associated with entities that seek information about the status of the enterprise applications 172, 182 and the enterprise servers 170, 180. The client devices 160, 162 may be associated with the retailer in the example provided. The present disclosure teaches the client devices 160, 162 requesting notifications about the condition of the enterprise application 172 or its interfaces or services. The reporting application 120 receives requests from the client devices 160, 162, reviews and approves or declines the requests, and registers the approved requests to receive notifications. The requests are stored in the requests database 140. The requests may request notifications about the interfaces, services, or other aspects of the enterprise applications 172, 182, the enterprise servers 170, 180, or other supporting hardware or software components. The request may ask to be provided notifications on a regular basis, for example every minute, even if the component is determined to be healthy and functioning normally. The client devices 160, 162 may effectively be interested in receiving a steady stream of "heartbeat" messages indicating that the monitored component is up and running and functioning at an acceptable level. The client devices 160, 162 may arrange to receive the notifications and are not necessarily the devices used to access the enterprise applications 172, 182. In the example provided, client devices 160, 162 may be used in a purchasing or procurement department of the retailer at a non-retail location. The enterprise applications 172, 182 of the telecommunications service provider may be accessed using different computers in the retailer's stores or service centers where customer contact occurs.

Client devices 160, 162 may receive notifications by sending database queries to the notifications server 150 that in turn submits the queries to the notifications database 152. A database management system (DBMS) executing on the notifications server 150 may process the query and return the results of the query to the client devices 160, 162. The notifications server 150 may store the queries in a scheduling system on behalf of the client devices 160, 162 and submit them to the notifications database 152 per the schedule. When client devices 160, 162 submit requests, the client devices 160, 162 specify how they want to receive notifications. While the preferred manner for submitting requests for notifications may be using a database query by subscription arrangement, alternative methods may be used for communicating with the reporting server 110 and the notifications server 150, for example by electronic mail, by short message service (SMS) messaging, hereafter text messaging, by telephone, by instant messaging (IM), or by another messaging means. The client devices 160, 162 specify in their requests the frequency at which they wish to receive notifications. The client devices 160, 162 also specify the conditions under which they should be provided notifications, for example on a periodic basis or, by contrast, only when a monitored resource, for example the enterprise application 172, is in a degraded condition or has failed. The notifications server 150 may store and submit a query for the client device 160 on a scheduled basis and only return results to the client device 160 when a predetermined condition is met, such as the monitored component, service, interface, or other resource is in a degraded or failed state.

The present disclosure teaches the use of a publish/subscribe messaging methodology where senders or publishers, for example the enterprise or other operator of the reporting server 110, generate and store notifications to a repository, in this disclosure the notifications database 152. The reporting server 110 may not create and publish the notifications for to be sent directly to specific receivers or subscribers, the client devices 160, 162 in this disclosure. In some cases, the reporting server 110 does not know or care about the identities or motives of the client devices 160, 162. The reporting server 110 instead merely knows that it has received a request for a specific type of monitoring for a specific component, the enterprise application 172, for example. In some embodiments, published notifications may be categorized into classes, without knowledge of what, if any, client devices 160, 162 there may be with an interest in the notifications. Client devices 160, 162 express interest in one or more classes, and only receive notifications that are of interest, without knowledge of what, if any, publishers there are. While the present disclosure may not contemplate this level of separation created by the reporting server 110, a barrier or layer is maintained that decouples reporting application 120 and monitored resources from the client devices 160, 162. This separation can allow for greater scalability and a more dynamic network topology.

The present disclosure teaches the decoupling and separation of the client devices 160, 162 from the enterprise applications 172, 182 and the publishing of notifications for the benefit of the client devices 160, 162 to be informed about the status of the enterprise applications 172, 182. By publishing frequent and current notifications about the status of the enterprise applications 172, 182 and their supporting components, reporting application 120 disincentives the users of the client devices 160, 162 from submitting test transactions or engaging in other behaviors that misuse the infrastructure of the enterprise. The publishing of the notifications and consequent removal of the incentives to submit test transactions may relieve the telecommunications service provider of the processing burden and associated cost arising from the submission and withdrawal of test transactions as discussed.

The event manager 122 receives events from various components within and supporting the enterprise servers 170, 180 and the enterprise applications 172, 182. The event manager 122 is a set of services that act as listeners on the network 194 in which the enterprise servers 170, 180 and other devices and components function. The event manager 122 may have daemon characteristics wherein it waits passively for monitored components to send it messages about events occurring with the components. A monitored processor in the enterprise server 170, for example, may send a constant stream of messages to the event manager 122 indicating that it is functioning normally and may also send traps or other messages indicating that it is overly stressed, degrading in condition, or may imminently fail. The messages may be generated by software agents resident in the enterprise server 170 or elsewhere. While the event manager 122 may passively wait for messages from monitored components, the event manager 122 may also actively send messages to execute checks on components that may be unable to send their own messages. The event manager 122 may also subscribe to events from commercial-off-the-shelf (COTS) software packages. While the event manager 122 is depicted in FIG. 1 as a component of the reporting server 110, in an embodiment the event manager 122 may execute on another computer. When the event manager 122 receives messages from monitored components, it stores the messages in the events database 130.

The reporting application 120 and event manager 122 and the actions they perform are characterized as "non-intrusive" because they are designed to place little processing burden on the monitored components. Instead of many different computers contacting the enterprise servers 170, 180, the enterprise applications 172, 182, and other monitored components, the event manager 122 is passive and awaits event messages from the monitored components. The monitored components may have software agents installed in them to periodically transmit events about the status of the monitored components. The reporting server 110 is the single destination and contact point for event messages coming from monitored components. Devices other than the reporting server 110 generally do not make contact with monitored components to determine the status of those components. The monitored components may effectively be "insulated" from contact by other computers and applications that may desire status information about the monitored components.

In an embodiment, the system 100 also comprises a resource dependency matrix 124 that lists the components and resources being monitored and describes dependencies that a monitored component has on other components. A user interface of the enterprise application 172, for example, may be dependent on the production database 192 and the production database 192 may be dependent on the enterprise server 170. If the enterprise server 170 fails, the production database 192 may be affected, and the customer or other user expecting to access the user interface may be unable to do so. By determining the dependencies between components, the system 100 will be better able to predict how a degradation or failure of one component may lead to problems with other components. This may promote the reporting application 120 to provide more timely and useful notifications to client devices 160, 162. This may also promote the proactive rerouting of network traffic or reallocation of processing load.

The resource dependency matrix 124 depicts dependencies between components as bi-directional and hierarchical in nature and may be structured in a B-tree arrangement. A B-tree is a data structure that keeps data sorted and allows searches, sequential access, insertions, and deletions, and is a generalization of a binary search tree. The resource dependency matrix 124 may be analyzed by the reporting application 120 to derive, for example, that a first component depends on a second component, such that if the second component is degraded or fails, the performance of the first component will be affected. The resource dependency matrix 124 may also conversely be analyzed and used to derive that the second component is depended on by the first component. By examining resource dependencies in both directions and incorporating them into its analysis of reported events with components and requests for notifications, the reporting application 120 may provide better service to the client devices 160, 162. The reporting application 120 may be better able to predict problems based on existing conditions and provide input for the development of strategies to work around component degradations or failures with reduced service disruption. While the resource dependency matrix 124 is depicted in FIG. 1 as a component of the reporting server 110, in an embodiment the resource dependency matrix 124 may be a component of the events database 130 or other device.

In an embodiment, the reporting application 120 also builds resource status metadata that comprise detailed status information about the enterprise applications 172, 182, enterprise servers 170, 180, other resources, and their components. This information comprises one or more of historical, current, and even potential future events associated with these resources. The future events may be associated with results of predictions made as described above wherein dependencies between components may be analyzed to predict a first component being affected by an event primarily associated with a second component. The resource status metadata is stored with other event information in the events database 130. The resource status metadata is placed in the events database 130 by the event manager 122, the component that receives the events. The reporting application 120 may manipulate some of the event data received by the event manager 122 to create resource status metadata that is then stored in the events database 130.

The reporting application 120 effectively joins the resource status metadata and other event information in the events database 130 with the resource dependency matrix 124 to determine the status of a resource or component at any level in the hierarchy. By combining the hierarchical structure depicting each monitored resource with the status information (past, current, and predicted) for the monitored resources, the reporting application 120 generates a single picture of the status of each of the monitored resources for the entire enterprise. The reporting application 120 may combine these two data structures on a frequent basis, for example once every five seconds, thirty seconds, or sixty seconds. These steps produce a refreshed picture of the status and availability of each of the monitored resources and the effects of the status on both depending components and depended-on components.

The reporting application 120 then cross-references the regularly refreshed events and device status information stored in the events database 130 with the contents of the requests database 140. As noted, the requests database 140 contains approved subscription requests. The subscription requests name the components of interest, for example the enterprise applications 172, 182, the production database 192, or the message queue server 190. The subscription requests also name the types of events of interest and the frequency of published notification requested. The reporting application 120 cross-references the current contents of the events database 130 with those of the requests database 140 to determine the notifications to create and publish. The reporting application 120 examines the events database 130 to find published events and examines the requests database 140 to determine which client devices 160, 162 are requesting published events about which components, for example the enterprise application 172. This process may involve linking a plurality of entries in tables in the events database 130 with entries in tables in the notifications database 152. As with the periodically refreshed picture of the status and availability of each of the monitored resources, this cross-referencing process may also take place on a frequent basis. The process may take place shortly after the status and availability of each of the monitored resources is determined.

The resulting product of the cross-referencing process described is the determination of events of interest to client devices 160, 162 that are published in notifications. The reporting application 120 stores these notifications in the notifications database 152 that is associated with the notifications server 150. The notifications server 150 is the contact point for client devices 160, 162 for obtaining subscribed notifications. The client devices 160, 162 may arrange in their subscription requests to receive the notifications on a push basis, a pull basis, or other basis. The client devices 160, 162 may arrange to have notifications sent or pushed to them by the notifications server 150 on a periodic basis. The notifications may be pushed to the client devices 160, 162 in one or more of a plurality of manners comprising electronic mail, text messaging, or telephone messaging. The notifications may be pushed by the notifications server 150 to the client devices 160, 162 on a scheduled basis or upon request of the client devices 160, 162.

The notifications may alternatively be pulled by the client devices 160, 162 from the notifications server 150 at the election of the client devices 160, 162 wherein the client devices 160, 162 initiate contact with the notifications server 150 and retrieve the notifications from the notifications database 152 or other designated device. In an embodiment, if a notification is associated with a situation determined to be an emergency and possibly requiring the immediate or prompt attention of the client devices 160, 162 the subscribed push or pull arrangement may be suspended and the notifications server 150 may initiate contact with the client devices 160, 162. The notifications server 150 may make contacts with the client devices 160, 162 until a response is received from the client devices 160, 162 or other designated device acknowledging that the emergency notification was received.

The reporting application 120 may arrange, upon request by the client devices 160, 162, to have notifications involving component degradations or failures to be accompanied by alerts. Such alerting notifications may be sent at a greater frequency than usual. Such alerting notifications may contain coding that causes an audible or other sensory alert to be emitted by the client device 160 or a portable electronic device, for example a mobile telephone or a pager. The alert level is interpreted by the client device 160 or the portable electronic device. The alert may continue to be sounded or otherwise exhibited until the recipient indicates acknowledgment. Subscriptions may be configured by client devices 160, 162 such that notifications are sent on an escalating basis when degradation, failure, or other event associated with a monitored resource has occurred and attention may be needed. The reporting application 120 may use predetermined thresholds in its analysis of events and may determine that in cases when metrics associated with one or a series of events exceed a threshold, the tenor of a notification should be changed, for example presented with greater urgency.

The reporting application 120 performs analysis of the events received and stored in the events database 130 before determining how a notification about the events should be presented, if at all. Some events, for example, may initially appear to indicate a problem and might cause alarm, but upon further analysis are found to be anomalous and not indicative of a problem warranting a notification. A sudden increase in processor utilization of the enterprise server 170 may be due to a plurality of factors, some not related to a degradation or impending failure of a physical processor in the enterprise server 170. After analysis, the reporting application 120 may determine that the increase in processor utilization was due to the neighboring enterprise server 180, that shared processing with the enterprise server 170, being briefly taken offline for rebooting for some unrelated reason. The reporting application 120 analyzes such situations and makes determinations about such situations before creating and publishing notifications. The reporting application 120 analyzes a plurality of metrics associated with events generated by monitored resources across time periods. Time periods may be at least one of one minute, one hour, and one day, for example.

In an embodiment, various interfaces may be used to publish notifications on the notifications server 150 and associated devices. The representational state transfer (REST) style of software architecture for distributed hypermedia systems such as the world wide web may be used. The java message service (JMS), a Java message-oriented middleware application programming interface for sending messages between two or more clients, may be used. The simple object access protocol (SOAP), a protocol specification for exchanging structured information in the implementation of web services in computer networks, may be used. The simple object access protocol (SOAP) may rely on extensible markup language (XML) for its message format.

In addition to providing notifications about unexpected situations such as degradations or failures associated with the quality of service for interfaces and their supporting enterprise applications 172, 182, the reporting application 120 may also advise of planned or scheduled outages of resources. The resource dependency matrix 124 may be used in determining devices or resources that are affected by these planned outages and may be of value in rerouting traffic or reallocating processing or other actions to minimize inconvenience to customers or other users of the enterprise applications 172, 182. In some situations, the client devices 160, 162 may provide information about unusual or exceptional business conditions that they may face for a duration that affect the demands that they may place on the enterprise applications 172, 182. This information may be useful to the reporting application 120 in examining the resource dependency matrix 124 and assisting with contingency planning for potential resource outages or other exceptional conditions.

In an embodiment, the enterprise providing the enterprise applications 172, 182 and the reporting application 120 may provide the interfaces and services under service level agreements with the client devices 160, 162. The provision of services to client devices 160, 162 described herein may take place within the parameters of the service level agreements. The gathering of event data by the event manager 122, the provision of subscription services to the client devices 160, 162, and the creation, posting, and transmission of notifications may take place as provided for by the service level agreement.

The present disclosure teaches the monitoring and reporting of events about components of enterprise applications 172, 182. In an embodiment, the enterprise application 172 may be associated with hundreds of monitored components. The details of the monitored components may be abstracted out of notifications such that information about the availability of interfaces and services is what is reported in the notifications. Since users may in practice care more about the status of the interfaces and services than about specific hardware and software components supporting the interfaces and services, the reporting application 120 may create notifications based on interface and service availability. The client device 160, may by contrast, be interested in specific hardware components of the enterprise server 170, for example one or more of the processors or an input/output device. The reporting application 120 may create notifications for these individual components or groups of components.

While the discussion herein of monitored hardware and software components may be directed primarily to components of the enterprise applications 172, 182 and the enterprise servers 170, 180 supporting them, other hardware and software components may be important to the satisfactory presentation and functioning of an interface or service provided by the enterprise applications 172, 182. The production database 192 may be regularly accessed by the enterprise applications 172, 182 for data read and write operations. If the production database 192 experiences problems such as data corruption, performance may degrade and performance degradation may affect the ability of the enterprise application 172 to function at a satisfactory level. The same may be true for the message queue server 190 that handles message storage and message transmission within and between enterprise applications 172, 182 and processes. If the message queue server 190 encounters problems such as queue depth of a message queue becoming too great, this may affect the ability of the message queue server 190 to support the enterprise application 172 and may cause the performance of the enterprise application 172 to suffer noticeably. If a network device, such as a network adapter in a server or router, becomes overloaded or begins to fail, these events may eventually become visible to a user of an interface of the enterprise application 172. While a user of an interface or service provided by the enterprise application 172 may notice a slowing or degradation of service, the cause is not necessarily the enterprise application 172. The enterprise server 180 may not report problems, and the ultimate source of the problem may be found to be with supporting hardware such as the message queue server 190, production database 192, a networking device, or a software component of any of these devices. The present disclosure teaches the event manager 122 gathering event data from each of these devices and the reporting application 120 presenting notifications about events at a level of abstraction that best suits the particular needs of the user as well as parameters of a service level agreement in effect, if any.

The client devices 160, 162 are computers that submit requests for resource monitoring under subscription arrangements with the enterprise or other operator of the reporting server 110 and the enterprise applications 172, 182. The client devices 160, 162 may be associated with an entity separate from the enterprise and may contractually enter into a service level agreement with the enterprise regarding expected levels of service of the enterprise applications 172, 182. The service level agreement may encompass the publish/subscribe arrangement described herein for the client devices 160, 162 to subscribe for and receive published notifications about resources of interest. In an embodiment, the client devices 160, 162 may be associated with organization units internal to the enterprise providing the enterprise applications 172, 182.

The network 194 promotes communication between the components of the system 100. The network 194 may be any communication network including a public data network (PDN), a public switched telephone network (PSTN), a private network, and/or a combination thereof.

Figure 2:
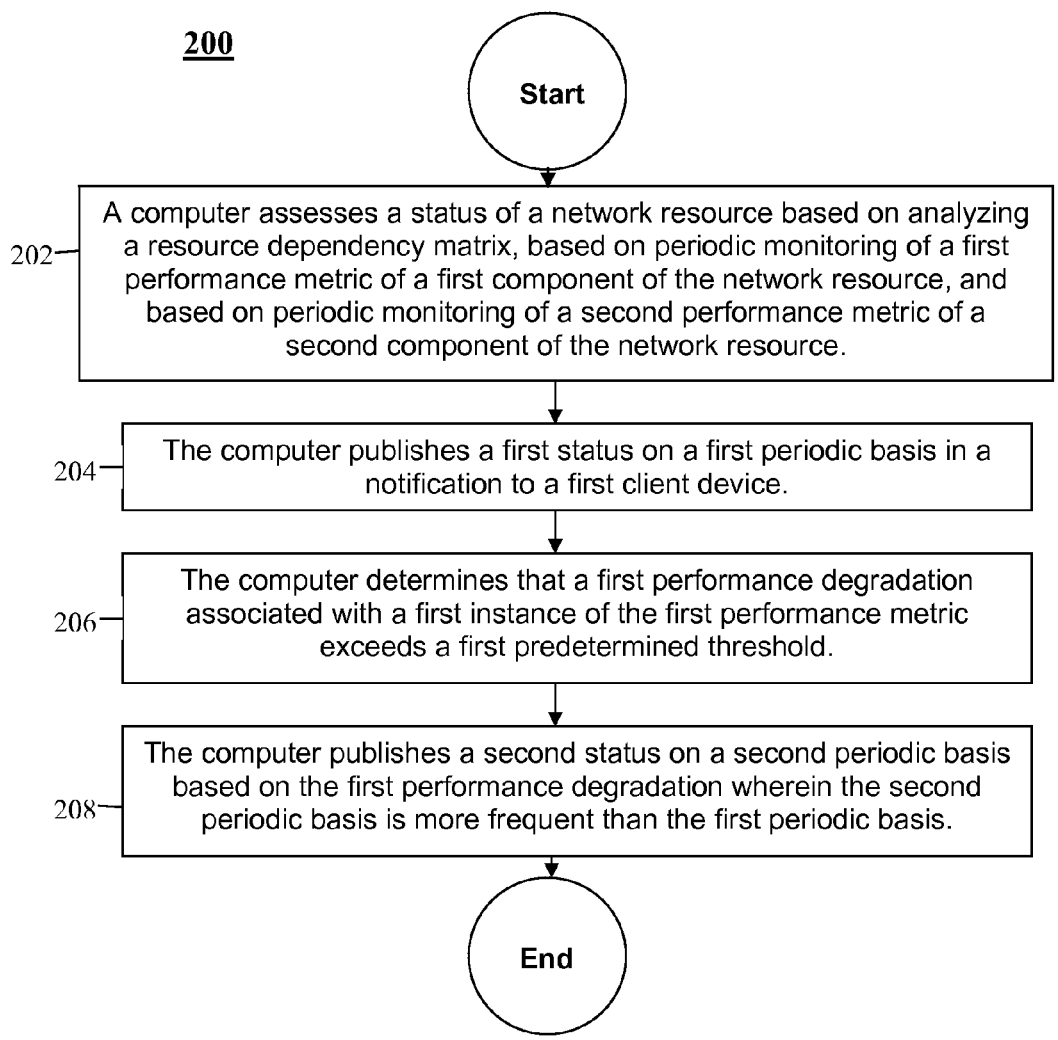
FIG. 2 is a flow chart illustrating a method according to an embodiment of the disclosure.

Turning now to FIG. 2, a processor-implemented method 200 is provided. Beginning at block 202, a computer, that may be the reporting server 110, assesses a status of a network resource based on analyzing the resource dependency matrix 124, based on periodic monitoring of a first performance metric of a first component of the network resource, and based on periodic monitoring of a second performance metric of a second component of the network resource. The resource dependency matrix 124, as indicated above, describes dependencies between a plurality of network and functional resources. The network resource may be the enterprise application 172.

At block 204, the computer publishes a first status on a first periodic basis in a notification to a first client device. The notification is published in the notifications database 152. At block 206, the computer determines that a first performance degradation associated with a first instance of the first performance metric exceeds a first predetermined threshold. The first performance metric has exceeded a threshold previously set that results in the reporting server 110 determining that an emergency situation is in effect or is impending.

At block 208, the computer publishes a second status on a second periodic basis based on the first performance degradation wherein the second periodic basis is more frequent than the first periodic basis. The status is published in at least one notification in the notifications database 152.

Figure 3:
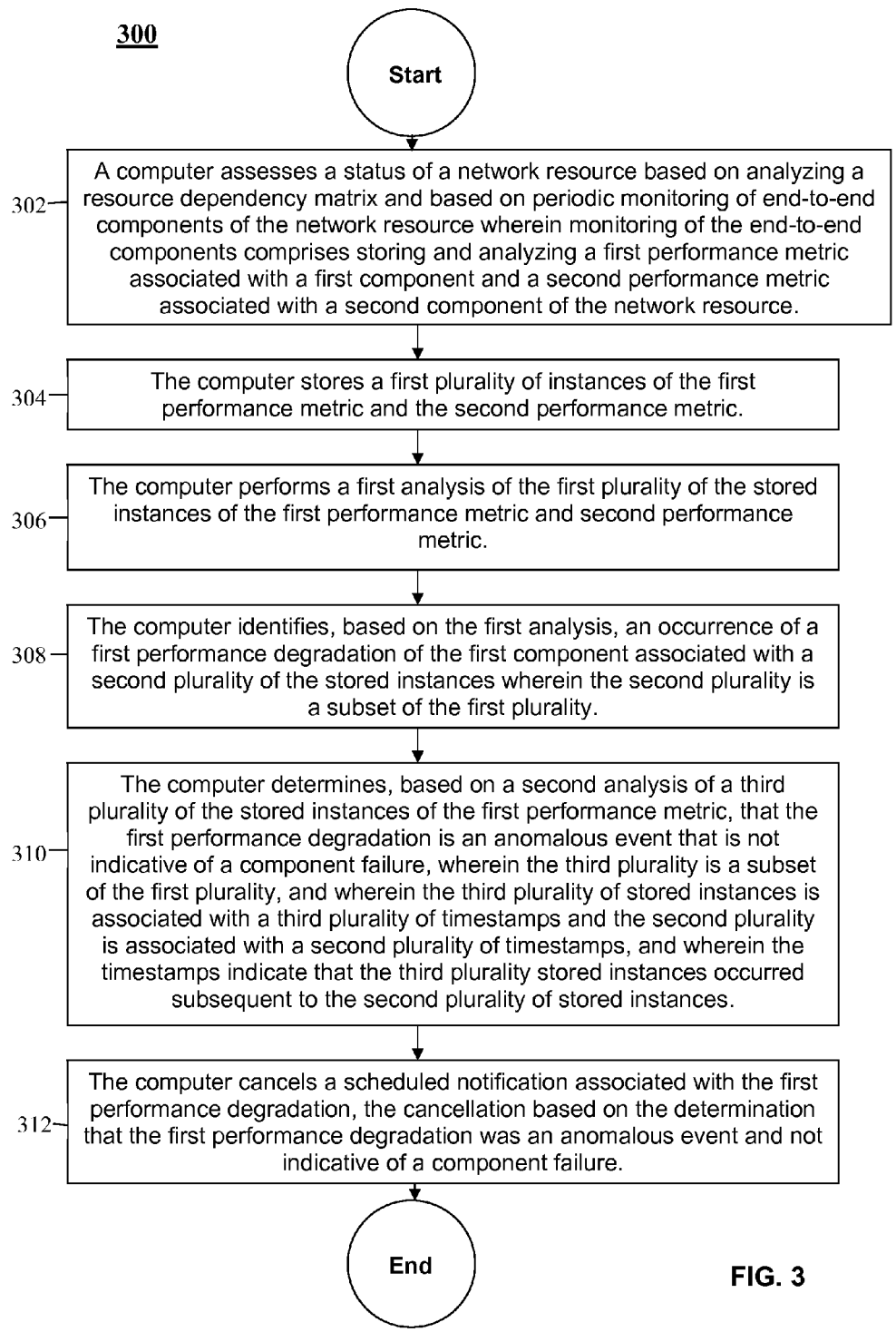
FIG. 3 is a flow chart illustrating a method according to an embodiment of the disclosure.

Turning now to FIG. 3, a processor implemented method 300 is provided. Beginning at block 302, a computer, that may be the reporting server 110, assesses a status of a network resource based on analyzing the resource dependency matrix 124, based on periodic monitoring of end-to-end components of the network resource wherein monitoring of the end-to-end components comprises storing and analyzing a first performance metric associated with a first component and a second performance metric associated with a second component of the network resource. The resource dependency matrix 124, as indicated above, describes dependencies between a plurality of network and functional resources. At block 304, the computer stores a first plurality of instances of the first performance metric and the second performance metric.

At block 306, the computer performs a first analysis of the first plurality of the stored instances of the first performance metric and second performance metric. At block 308, the computer identifies, based on the first analysis, an occurrence of a first performance degradation of the first component associated with a second plurality of the stored instances wherein the second plurality is a subset of the first plurality.

At block 310, the computer determines, based on a second analysis of a third plurality of the stored instances of the first performance metric, that the first performance degradation is an anomalous event that is not indicative of a component failure, wherein the third plurality is a subset of the first plurality and wherein the third plurality occurred subsequent to the second plurality. Timestamps associated with the third plurality and the second plurality indicate that the third plurality of stored instances of the first performance metric are associated with events that occurred chronologically after events associated with the second plurality of stored instances. While the observed performance degradation did occur, the reporting application 120 determines that it is not caused by or otherwise associated with a problem that will become damaging on a material basis. At block 312, the computer cancels a scheduled notification associated with the first performance degradation, the cancellation based on the determination that the first performance degradation was an anomalous event and not indicative of a component failure. The notification, that had been scheduled by the reporting application 120 to be placed in the notifications database, is canceled.

Figure 4:
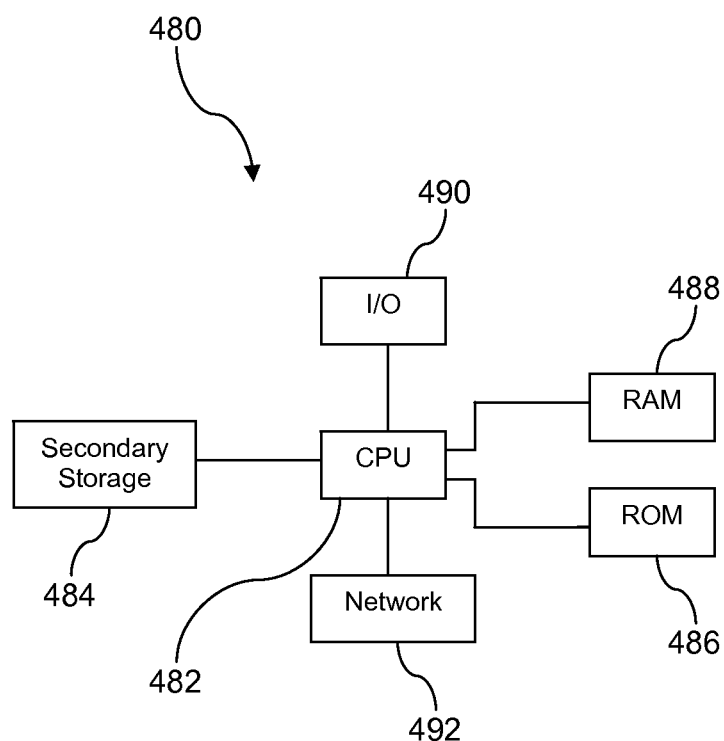
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, a baseband signal and/or a signal embodied in a carrier wave may be referred to as a transitory signal. In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer 480 system is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for end-to-end communication service monitoring, comprising:
a hosting computer comprising an enterprise application; and
a reporting server separate from the hosting computer, comprising:
a processor;
a memory, the memory storing in part a resource dependency matrix, wherein the resource dependency matrix is bi-directional and hierarchical and comprises descriptions of dependencies between a plurality of network and functional resources; and
a monitoring application stored in the memory, that, when executed by the processor:
receives a subscription message from a client device requesting periodic notifications of a status of the enterprise application executing on the hosting computer, wherein the subscription message comprises at least one of types of events published in the periodic notifications, a frequency of the periodic notifications, or a communication mechanism for communication of the periodic notifications,
in response to receiving the subscription message, registers the client device for periodic notifications of the status of the enterprise application, wherein the client device is separate from the enterprise application,
monitors a metric associated with a first component of the enterprise application and monitors a metric associated with a second component of the enterprise application,
determines the status of the enterprise application based on the metric associated with the first component, based on the metric associated with the second component, and based on the resource dependency matrix, wherein the plurality of network and functional resources comprise the first component and the second component,
periodically publishes the periodic notifications of the status to the client device in accordance with the subscription message,
performs an analysis of a plurality of the instances of the metric associated with the first component and the metric associated with the component,
based on the analysis, identifies an occurrence of a performance degradation of the first component associated with a subset of the plurality of the instances,
determines that the performance degradation is an anomalous event that is not indicative of a component failure based on an analysis of a different subset of the plurality of instances, and
cancels a scheduled notification associated with the performance degradation based on the determination that the performance degradation is an anomalous event and not indicative of a component failure.

2. The system of claim 1, wherein the client device receives the periodic notifications based on a subscription arrangement.

3. The system of claim 1, wherein the enterprise application is an application accessed by a plurality of client devices.

4. The system of claim 1, wherein the first component and the second component are one of software components of the enterprise application and one of hardware components of at least one server hosting the enterprise application, hardware components of a storage device, or hardware components of a network adapter.

5. The system of claim 4, wherein the hardware components of the at least one server comprise a processor, a memory, or at least one input/output component.

6. The system of claim 4, wherein the software components comprise at least one of message queue server components or database components associated with the enterprise application.

7. The system of claim 1, wherein the periodic notifications are pushed to the client device.

8. A processor-implemented method for end-to-end monitoring of a communication service, comprising:
receiving, by a reporting server, a subscription message from a client device requesting periodic status messages of a status of an enterprise application executing on a hosting computer, wherein the reporting server is separate from the hosting computer, and wherein the subscription message comprises at least one of types of events published in the periodic notifications, a frequency of the periodic notifications, or a communication mechanism for communication of the periodic notifications;
in response to receiving the subscription message, registering, by the reporting server, the client device for periodic status messages of the status of the enterprise application, wherein the client device is separate from the enterprise application;
assessing, by the reporting server, the status of the enterprise application based on analyzing a resource dependency matrix, based on periodic monitoring of a first performance metric of a first component of the enterprise application, and based on periodic monitoring of a second performance metric of a second component of the enterprise application, wherein the resource dependency matrix describes dependencies between a plurality of network and functional resources that include the first component and the second component;
publishing, by the reporting server, a first status message of a plurality of status messages based on the statuses of the first component and the second component on a first periodic basis in a notification to the client device in accordance with the subscription message;
determining, by the reporting server, that a performance degradation associated with an instance of the first performance metric exceeds a predetermined threshold or is an anomalous event and not indicative of a component failure;
in response to determining that the performance degradation exceeds the predetermined threshold, publishing, by the reporting server, a second status message of the plurality of status messages based on the statuses of the first component and the second component on a second periodic basis in accordance with the subscription message, wherein the second periodic basis is more frequent than the first periodic basis; and
in response to determining that the performance degradation is an anomalous event and not indicative of a component failure, canceling, by the reporting server, a scheduled notification associated with the performance degradation.

9. The method of claim 8, wherein the reporting server publishes the first status message and publishes the second status message in notifications to the client device under a subscription arrangement.

10. The method of claim 9, further comprising providing an alert message about the second status published on the second periodic basis based on the performance degradation exceeding the predetermined threshold.

11. The method of claim 8, wherein status messages published on the second periodic basis comprise alerting indicia.

12. The method of claim 8, wherein the performance degradation exceeding the predetermined threshold indicates a probability of failure of the first component.

13. The method of claim 12, wherein a failure of the first component results in a failure of the enterprise application.

14. A processor-implemented method for end-to-end monitoring of a communication service, comprising:
- receiving, by a reporting server, a subscription message from a client device requesting periodic status notifications of a status of an enterprise application executing on a hosting computer, wherein the reporting server is separate from the hosting computer, and wherein the subscription message comprises at least one of types of events published in the periodic notifications, a frequency of the periodic notifications, or a communication mechanism for communication of the periodic notifications;
- in response to receiving the subscription message, registering, by the reporting server, the client device for periodic status notifications of the status of the enterprise application, wherein the client device is separate from the enterprise application;
- assessing, by the reporting server, the status of the enterprise application based on analyzing a resource dependency matrix and based on periodic monitoring of end-to-end components of the enterprise application, wherein monitoring of the end-to-end components comprises storing and analyzing a first performance metric associated with a first component and a second performance metric associated with a second component of the enterprise application, and wherein the resource dependency matrix describes dependencies between a plurality of network and functional resources;
- storing, by the reporting server, a plurality of instances of the first performance metric and the second performance metric;
- performing, by the reporting server, a first analysis of the plurality of the stored instances of the first performance metric and second performance metric;
- identifying, by the reporting server, based on the first analysis, an occurrence of a performance degradation of the first component associated with first subset of the plurality of the stored instances;
- determining, by the reporting server computer, based on a second analysis of a second subset of the plurality of the stored instances, that the performance degradation is an anomalous event that is not indicative of a component failure, wherein the first subset is associated with a first plurality of timestamps and the second subset is associated with a second plurality of timestamps, and wherein the first and second plurality of timestamps indicate that the second subset of the plurality of the stored instances occurred subsequent to the first subset of the plurality of the stored instances;
- canceling, by the reporting server, a scheduled notification associated with the performance degradation, the cancellation based on the determination that the performance degradation was an anomalous event and not indicative of a component failure; and
- publishing, by the reporting server, the status of the enterprise application on a periodic basis in notifications to the client device in accordance with the subscription message.

15. The method of claim 14, wherein the reporting server publishes the status on the periodic basis based on a subscription arrangement.

16. The method of claim 14, wherein the second subset of the plurality of the stored instances of the first performance metric are analyzed to determine that the performance degradation ceased.

17. The method of claim 14, wherein the anomalous event is associated with a processing load increase due to a failure of a proximate component sharing processing load with the enterprise application.

18. The method of claim 14, wherein the first component is a message queue server.

19. The method of claim 18, wherein the performance degradation is an increase in message queue depth.

* * * * *